United States Patent [19]

Ramig, Jr.

[11] 4,025,483

[45] May 24, 1977

[54] STABILIZING AQUEOUS TITANIUM DIOXIDE PIGMENT SLURRIES BY BLENDING THEREWITH PLASTIC PARTICLES

[75] Inventor: Alexander Ramig, Jr., Brunswick, Ohio

[73] Assignee: SCM Corporation, New York, N.Y.

[22] Filed: Oct. 6, 1975

[21] Appl. No.: 619,801

[52] U.S. Cl. .................. 260/29.6 MM; 260/29.6 R
[51] Int. Cl.² ........................................ C08L 25/06
[58] Field of Search ..... 260/29.6 MM, 29.4, 42.55, 260/29.6 R; 427/221; 428/403; 106/300

[56] References Cited

UNITED STATES PATENTS

| | | | |
|---|---|---|---|
| 3,737,404 | 6/1973 | Berstein | 260/39 R |
| 3,839,253 | 10/1974 | Kershaw et al. | 260/29.4 R |
| 3,949,138 | 4/1976 | Heiser | 260/29.6 R |

Primary Examiner—M. J. Welsh
Attorney, Agent, or Firm—Jerry K. Mueller, Jr.

[57] ABSTRACT

The stability of an aqueous titanium dioxide pigment slurry can be enhanced by blending therewith hard plastic particles having average particle size of about 1,000–10,000 A.

10 Claims, No Drawings

STABILIZING AQUEOUS TITANIUM DIOXIDE PIGMENT SLURRIES BY BLENDING THEREWITH PLASTIC PARTICLES

BACKGROUND OF THE INVENTION

This invention relates to aqueous titanium dioxide pigment slurries and more particularly to enhancing the stability thereof.

It is desirable to handle titanium dioxide pigment in bulk form, especially when large amounts of the pigment are required. An aqueous slurry of the pigment is an advantageous method for such bulk handling. However, a major drawback to the use of such slurries is that they are unstable with the pigment tending to precipitate from the slurry, appreciably cake, and resist return to the initial dispersion-state of the slurry.

Prior proposals attempt to stabilize such pigment slurries by employing a variety of additives such as surfactants, sequestering agents, chelating agents, and dispersing agents, which include citric acid, acetylacetone, polyhydric alcohols or alkali metal salts with amines, etc. Others coat the pigment with oxides of aluminum, propane diols, monoethanol amines, etc. The stability of the titanium dioxide slurry yet remains a problem even in these modified systems.

It has now been discovered that the stability of a titanium dioxide slurry is substantially increased by dispersing titanium dioxide and hard plastic particles together into water to provide a stabilized aqueous slurry of titanium pigment and plastic particles.

SUMMARY OF THE INVENTION

The improvement in process for stabilizing an aqueous titanium dioxide pigment slurry comprises blending therein hard plastic particles having average particle size of about 1,000–10,000 A. The resulting stabilized blend comprises an aqueous slurry of titanium dioxide pigment and hard plastic particles having average size of about 1,000–10,000 A, the proportion of the plastic particles in the blend adequate to stabilize the titanium dioxide in the blend.

DETAILED DESCRIPTION OF THE INVENTION

The hard, plastic pigment particles should not agglomerate or coagulate in the pigment blend and have a glass transition temperature (Tg) greater than about 25° C., desirably greater than about 30° C., and preferably about 50° C. or higher. The polymer particles are water insoluble and are nonfilm-forming in use. The $TiO_2$-plastic particles blend generally will be stored and transported at tempertures of about 20° C. to 30° C. The term "glass transition temperature" is a term well known in the art and generally defines the minimal softening temperature descriptive of the internal melting point for a polymer particle without a phase change wherein the polymer preserves the outward appearance of a solid but becomes rubbery and tacky, undergoing plastic flow and elastic deformation. The glass transition temperature can be measured in accordance with 41 *Journal of Paint Technology*, pages 167–178 (1969).

The stabilized pigment blend with plastic particles is useful in formulating latex paints wherein the stabilized blend of this invention comprising a water dispersion of $TiO_2$ and plastic particles can be expediently mixed with film-forming binder to produce a latex paint.

Additionally, the plastic particles are water insoluble under conditions of storage of the blend.

The polymer particles have average particle diameter between about 1,000 A and about 10,000 A (0.1 to 1.0 micron). Advantageously, the polymer particles are between about 1,000 and 6,000 A, and preferably between about 2,000 and about 4,000 A. Average particle diameters can be measured in accordance with known electron microscopy techniques described by S. H. Maron in "Journal of Applied Physics," Volume 23, page 900 (August, 1952). The plastic particles preferably are substantially spherical in geometrical shape and advantageously have a specific density of about 0.9–1.7 as measured by ASTM test D-153. Preferably, the plastic particles have a particle diameter distribution typical of most monodispersed systems.

Representative polymers which are suitable for the plastic particles include the nonfilm-forming, water-insoluble, latex addition polymers of polymerizable ethylenically unsaturated monomers such as the monovinylidene aromatic monomers, saturated esters of alpha, beta-ethylenically unsaturated carboxylic acids, ethylenically unsaturated esters of non-polymerizable carboxylic acids, ethylenically unsaturated nitriles, aliphatic alpha-monoolefins, and like polymerizable and copolymerizable ethylenically unsaturated monomers. Advantageously, the plastic particles are polymers and copolymers of styrene, vinylchloride, methylmethacrylic acid, and like polymers and copolymers as shown, for example, in U.S. Pat. No. 3,423,351 provided that the nonfilm-forming and water-insolubility characteristics as above described are met. Preferably, the plastic particles are polystyrene and the examples of this application will be described in reference thereto.

The plastic particles can be made by emulsion polymerization of a suitable monomer or mixture of monomers. Typically, the monomeric material is dispersed in aqueous medium containing anionic and nonionic surfactants under emulsion polymerization conditions wherein the ratio of surfactants is carefully controlled along with the temperature, time, and water solubility of the monomeric components in the aqueous dispersion.

Titanium dioxide pigments include rutile and anatase titanium dioxide and generally have an average particle size of less than about 5,000 A, and preferably between about 2,000 and about 5,000 A. Particle sizes larger than 5,000 A can be advantageously employed also.

The resulting blend will have a water content of about 10 to 50 percent by weight of the blend and the total solids content (plastic particles and titanium dioxide pigment) of from about 50 to about 90 percent by weight of the blend. The weight ratio of the titanium dioxide pigment to the plastic particles can be from about 1.0 to about 3.0, with about 1.5 to about 2.5 being preferred. Advantageously, the blend will contain about 45 percent titanium dioxide pigment and about 20 percent plastic particles by weight of the blend.

In practicing this invention, the pigment and plastic particles can be added to water and blended, for example, using a Cowles' mixer or the like. Preferably, an aqueous emulsion of the plastic particles is formed and added to an aqueous suspension of the titanium dioxide pigment, followed by blending.

EXAMPLE 1

A batch of the stabilized pigment blend of this invention was formulated from the following tabled ingredients.

| Weight (Grams) | Ingredient |
|---|---|
| 26.8 | Water |
| 80 | Titanium dioxide pigment, average particle size of about 3,000 Å |
| 17.3 | 2.5% aqueous solution of methyl ether of cellulose (Methocel), a thickener |
| 1.1 | Aqueous solution of sodium salt of polymeric-carboxylic acid (Tamol 731), a pigment dispersant |
| 74.8 | Polystyrene particles, average particle diameter of about 2,500 Å |

The tabled ingredients were dispersed in a Cowles' mixer. The stabilized pigment blend contained by weight about 40% of $TiO_2$ pigment, about 19% polystyrene particles, and the weight ratio of the $TiO_2$ pigment to the polystyrene particles was about 2:1.

EXAMPLE 2

A batch of the inventive stabilized pigment blend was compounded similarly as was the batch of Example 1. This batch contained by weight about 40% of the $TiO_2$ pigment, about 18% of the polystyrene particles, and the weight ratio of the pigment to polystyrene particles was about 2.26.

The stabilized pigment blend was stored at room temperature for about four months. After such extended storage time, the stabilized pigment blend demonstrated improved storage stability. Stability was measured subjectively by visual observation of the separation of the solids from the water of the blend.

EXAMPLE 3

An aqueous $TiO_2$ slurry containing $TiO_2$ dispersed in water was formulated as a control for comparative stability testing with the blend of Example 1. The control pigment slurry was formulated as follows:

| Weight (Grams) | Control Pigment Slurry Formulation Ingredient |
|---|---|
| 200.0 | Water |
| 650.0 | Titanium dioxide pigment, average particle size of about 3,000 Å |
| 140.9 | 2.5% aqueous solution of a methyl ether of cellulose (Methocel), a thickener |
| 9.1 | Aqueous solution of a sodium salt of polymeric-carboxylic acid (Tamol 731), a pigment dispersant. |

The above-tabled ingredients were dispersed in a Cowles' mixer. The control pigment slurry contained by weight 65% of the $TiO_2$ pigment.

The stability of each pigment slurry was determined by measuring the viscosity thereof with a Brookfield viscosimeter at room temperature. The control sample and the stabilized sample each were stored at 120° F. and their viscosities measured at two intervals of storage time. The storage temperature used was significantly higher than is generally practiced in plant operations, but provides a good indication of the stability of the stored pigment slurries. The comparative results of the stability tests are displayed below.

| | COMPARATIVE STABILITY RESULTS | |
|---|---|---|
| Time (hours) | Control Slurry of $TiO_2$ and Water Viscosity (centipoises) | Stabilized Slurry of Example 1 Viscosity (centipoises) |
| 0 | 152,800 | 127,400 |
| 48 | Gelled | 170,000 |
| 144 | Gelled | 196,000 |

No physical separation of the solids from the water was detectable for the stabilized slurry. The control sample, however, separated and gelled, indicating very poor stability.

I claim:

1. A process for improving the stability of an aqueous slurry of titanium dioxide pigment having average particle size of less than about 5,000 A, which comprises:
   blending therewith water-insoluble, nonfilm-forming polymer particles of latex addition polymers of polymerizable ethylenically unsaturated monomers, said polymer particles having average particle size of about 1,000 A to about 10,000 A and having a glass transition temperature (Tg) greater than about 30° C., said blend comprising by weight from about 10% to about 50% water and at least about 10% of said polymer particles.

2. A blend of
   a. titanium dioxide pigment having average particle size of less than about 5,000 A;
   b. from about 10% to about 50% water by weight of said blend; and
   c. at least about 10% by weight of said blend of water-insoluble, nonfilm-forming polymer particles of latex addition polymers of polymerizable ethylenically unsaturated monomers, said polymer particles having average particle size of about 1,000 A to about 10,000 A and having a glass transition temperature (Tg) greater than 30° C., the weight proportion of said polymer particles in said blend adequate to increase the stability of said blend.

3. The process of claim 1 wherein said polymer particles have average particle size of about 1,000 A to about 6,000 A.

4. The process of claim 3 wherein said particle size is about 2,000 A to about 4,000 A.

5. The process of claim 1 wherein said polymer particles are provided in an aqueous emulsion.

6. The process of claim 1 wherein the weight ratio of said titanium dioxide pigment to said polymer particles is from about 1 to about 3.

7. The process of claim 6 wherein said weight ratio is from about 1.5 to about 2.5.

8. The process of claim 1 wherein said polymer particles are polystyrene particles.

9. The blend of claim 2 wherein the weight ratio of said titanium dioxide pigment to said polymer particles is from about 1 to about 3.

10. The blend of claim 2 wherein said titanium dioxide pigment is provided in aqueous dispersion and said polymer particles are provided in aqueous emulsion.

* * * * *